United States Patent [19]
Toyota

[11] Patent Number: 5,764,513
[45] Date of Patent: Jun. 9, 1998

[54] CHECK SYSTEM FOR PRODUCTION PROCESS PROCEDURE

[75] Inventor: Hideo Toyota, Tokyo, Japan

[73] Assignee: NEC Corporation, Tokyo, Japan

[21] Appl. No.: 806,385

[22] Filed: Feb. 27, 1997

[51] Int. Cl.$^6$ .................................................. G06F 19/00
[52] U.S. Cl. ........................ 364/468.01; 364/468.28; 364/468.1; 395/906
[58] Field of Search ...................... 364/468.01–468.03, 364/468.05–468.17, 468.28, 552; 395/11, 62, 54, 51, 906, 65

[56] References Cited

U.S. PATENT DOCUMENTS

| | | | |
|---|---|---|---|
| 4,591,983 | 5/1986 | Bennett et al. | 395/65 |
| 5,521,814 | 5/1996 | Teran et al. | 364/468.1 |
| 5,625,560 | 4/1997 | Kikuchi | 364/468.09 |

FOREIGN PATENT DOCUMENTS 6176994  6/1994  Japan .

OTHER PUBLICATIONS

European Patent Office Online Search dated Apr. 22, 1997.
European Search Report dated Apr. 22, 1997.

*Primary Examiner*—Paul P. Gordon
*Assistant Examiner*—Steven R. Garland
*Attorney, Agent, or Firm*—Whitham, Curtis & Whitham

[57] ABSTRACT

Disclosed is a check system for a production process procedure in a production line for a plurality of items with its varying quantity which has a plurality of production steps, which has the steps of: unpitying information of the production process procedure with a combination of a big step name and a small step name which have a hierarchical relation with each other to a first deduction means; dividing the production process procedure into one or more big step blocks on a process flow block knowledge base referred to by the first deduction means, wherein the process flow block knowledge base includes a knowledge unit for storing a knowledge as to a combination of a big step name and a small step name; unpitying information as to the divided blocks to a second deduction means; and judging whether or not the lineup order of the one or more big step blocks and the lineup order of a small step name in each of the blocks are normal on a knowledge base for judging process flow referred to by the second deduction means, wherein the knowledge base for judging process flow includes a before and after block knowledge unit for storing a knowledge for judging a relationship with before and after block names and an internal block knowledge unit for storing a knowledge for judging the lineup order of a small step name in each of the blocks.

4 Claims, 9 Drawing Sheets

FIG. 1B PRIOR ART

| STEP (A) | STEP (B) | STEP THAT SHOULD EXIST BETWEEN A AND B | STEP THAT MAY NOT EXIST BETWEEN A AND B | SPECIAL STEP | ERROR CODE |
|---|---|---|---|---|---|
| LITHOGRAPHY | RESIST REMOVAL | — | THERMAL OXIDATION | — | 005 |
| LITHOGRAPHY | LITHOGRAPHY | RESIST REMOVAL | — | — | 006 |

FIG.5A

| NAME OF BLOCK / NAME OF NEXT BLOCK | A | B | C | . . . . . . . . . . . . . . . | Z |
|---|---|---|---|---|---|
| A | △ | × | ○ | . . . . . . . . . . . . . . . | ○ |
| B | △ | | | | |
| C | ○ | | | | |
| . | . | | | | |
| . | . | | | | |
| . | . | | | | |
| . | . | | | | |
| . | . | | | | |
| . | . | | | | |
| . | . | | | | |
| Z | × | | | | |

FIG.5B

| NAME OF BLOCK | A | A | B | . . . . . . . . . | Z |
|---|---|---|---|---|---|
| LINEUP OF NAME OF SMALL STEP | a b c d . . . . . . | a b e f . . . . . . | . . . . . . . . . . | . . . . . . . . . . | . . . . . . . . . . |

FIG.8

| BLOCK INSERT POSITION \ NAME OF DERIVATIVE BLOCK | A' B' C' . . . . . . . . . . . . . Z' |
|---|---|
| ① | O x x |
| ② | x x O |
| . | |
| . | |
| . | |
| . | |
| . | |
| . | |
| . | |
| . | |
| . | |

CHECK SYSTEM FOR PRODUCTION PROCESS PROCEDURE

FIELD OF THE INVENTION

This invention relates to a check system for a production process procedure, and more particularly to, a check system for a production process procedure in a production line for a plurality of items of varying quantity, which production process has a plurality of production steps.

BACKGROUND OF THE INVENTION

In a production line for a plurality of items with its varying quantity which has a plurality of production steps, the production process procedure as to each item has been lengthened and complicated. If the production process procedure is checked by hand, it takes a long time and a check mistake may be made. Therefore, a system for automatically checking the production process procedure prepared for each item is desired.

Japanese patent application laid-open No.6-176994(1994) discloses a check system for a production process procedure which is invented with the object of fast checking a very long and complicated process flow and which has a function that, in one package composed of a step to another step, a step to be existed, a step not to be existed, a step to be always existed when a step exists and so on are checked.

FIGS. 1A and 1B show the composition of a check system for a production process procedure disclosed in Japanese patent application laid-open No.6-176994(1994) and a package administration table suggested therein, respectively.

As shown in FIG. 1A, this check system comprises a package check unit 831, a package administration table 833, a check judgement unit 857 and a check administration table 859, wherein the package check unit 831 judges whether or not a step existing in each package is normal by order of the check judgement unit 857 while referring to the package administration table 833. For example, the package administration table 833, as shown in FIG. 1B, stores names of steps composing each package(Step A, Step B), the name of a step that should exist in a package, the name of a step that may not exist in a package, the name of a step(special step) that is indispensable when a step exists and an error code. In detail, between 'lithography' (Step A) and 'resist removal' (Step B), the step of 'thermal oxidation' should not exist, and, if the step of 'thermal oxidation' exists, then an error code 005 which means that the package is not normal is notified.

However, the above check system has problems as described below.

First, in this check system, since each of the steps is checked about its individual name and a relationship with the before and after steps, it takes a long deduction time to check the production process procedure with hundreds of steps. Furthermore, a huge knowledge base will be needed to check it, therefore causing difficulty in the maintenance.

Second, in the check system, since each of steps is checked about a relationship with the before and after steps, even when another step is inserted into a place where the lineup order in a procedure of production process is almost settled, the step may not be prohibited. Therefore, the lineup order and names of steps in the production process procedure may be varied.

SUMMARY OF THE INVENTION

Accordingly, it is an object of the invention to provide a check system for a production process procedure in which the lineup order of steps in a very long and complicated production process procedure can be fast checked.

It is a further object of the invention to provide a check system for a production process procedure in which the process flow can be standardized.

According to the invention, a check system for a production process procedure in a production line for a plurality of items of varying quantity, which, production process has a plurality of production steps, the check system comprises the steps of:

supplying information of the production process procedure with a combination of a big step name and a small step name which have a hierarchical relation with each other to a first deduction means;

dividing the production process procedure into one or more big step blocks on a process flow block knowledge base referred to by the first deduction means, wherein the process flow block knowledge base includes a knowledge unit for storing a knowledge as to a combination of a big step name and a small step name;

supplying information as to the divided blocks to a second deduction means; and judging whether or not the lineup order of the one or more big step blocks and the lineup order of a small step name in each of the blocks are normal on a knowledge base for judging process flow referred to by the second deduction means, wherein the knowledge base for judging process flow includes a before and after block knowledge unit for storing a knowledge for judging a relationship with before and after block names and an internal block knowledge unit for storing a knowledge for judging the lineup order of a small step name in each of the blocks.

According to another aspect of the invention, a check system for a production process procedure in a production line for a plurality of items of varying quantity, which production process has a plurality of production steps, the check system comprises the steps of:

supplying information of the production process procedure with a combination of a big step name and a small step name which have a hierarchical relation with each other to a first deduction means;

dividing the production process procedure into one or more basic process procedure blocks and derivative blocks on a process flow block knowledge base referred to by the first deduction means, wherein the process flow block knowledge base includes a knowledge unit for storing a knowledge as to a combination of a big step name and a small step name and a knowledge unit for storing a knowledge as to the basic process procedure blocks;

supplying information as to the divided blocks to a second deduction means; and judging whether or not a position of the derivative block inserted between the basic process procedure blocks and the lineup order of a small step name in each of the blocks are normal on a knowledge base for judging process flow referred to by the second deduction means, wherein the knowledge base for judging process flow includes a derivative block position knowledge unit for storing a knowledge for judging the position of the derivative block inserted between the basic process procedure blocks and an internal block knowledge unit for storing a knowledge for judging the lineup order of a small step name in each of the blocks.

BRIEF DESCRIPTION OF THE DRAWINGS

The invention will be explained in more detail in conjunction with the appended drawings, wherein:

FIGS. 1A and 1B show the composition of the conventional check system for a production process procedure disclosed in Japanese patent application laid-open No.6-176994(1994) and a package administration table suggested therein, respectively, FIGS. 5A and 5B show a content of a knowledge unit for judging before and after blocks and a content of a knowledge unit for judging internal block, respectively, in the first embodiment, FIG. 8 shows a content of a knowledge unit for derivative block's position in the second embodiment.

DESCRIPTION OF THE PREFERRED EMBODIMENTS

A check system for a production process procedure in the first preferred embodiment will be explained in FIG. 2.

Figure 1A:
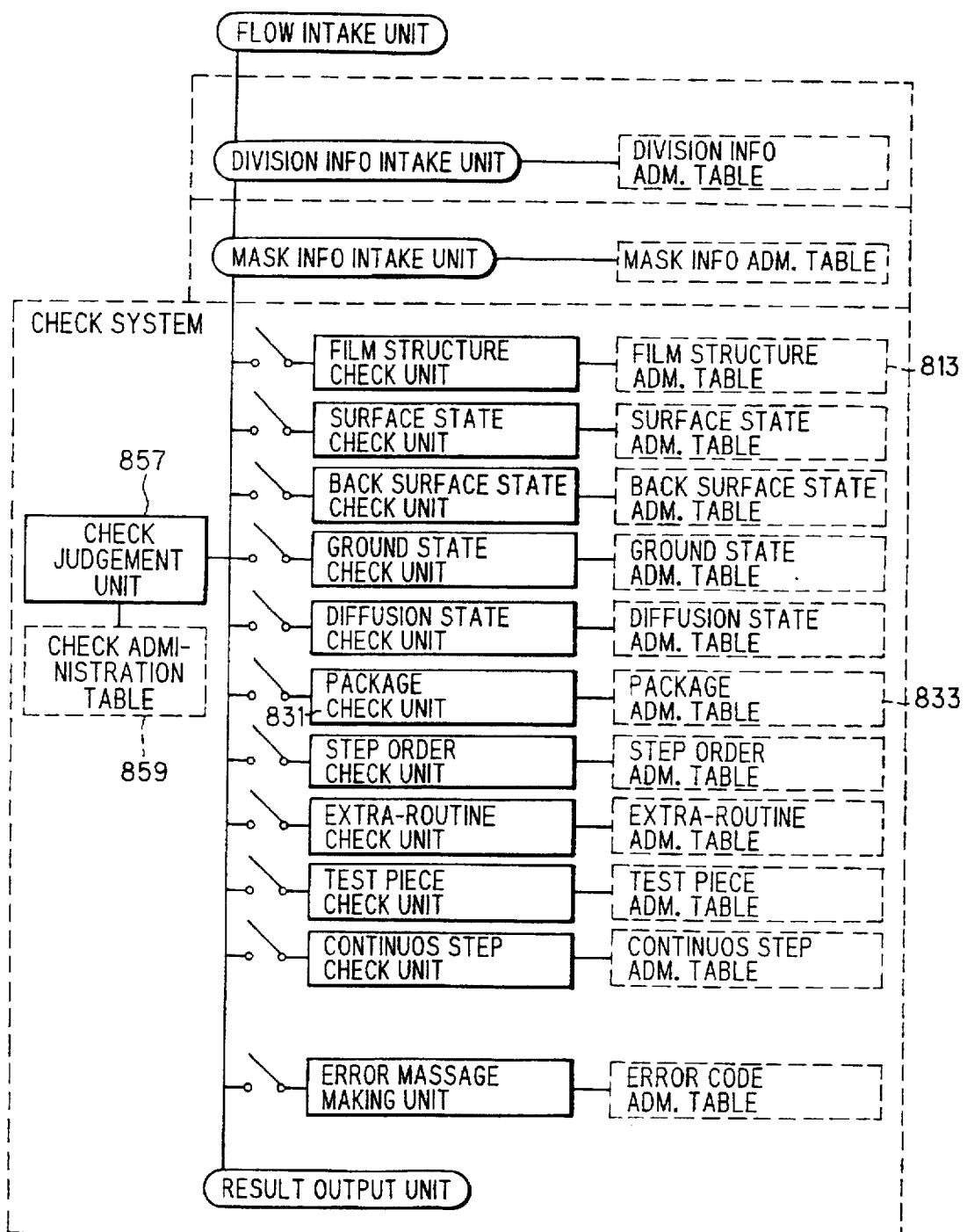
Figure 2:
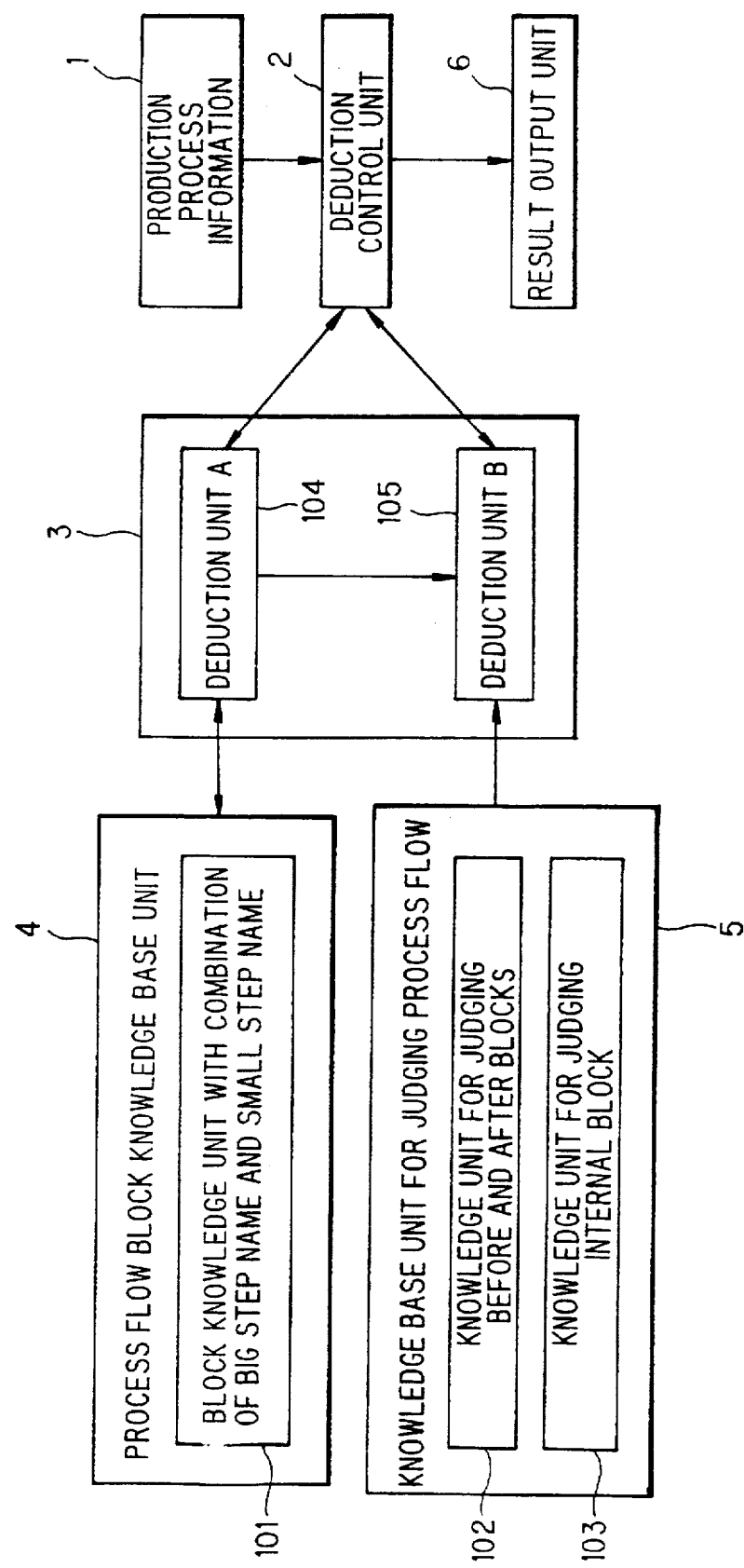
FIG. 2 is a block diagram showing a check system for a production process procedure in a first preferred embodiment according to the invention.

As shown in FIG. 2, the check system in the first embodiment comprises production process information 1, a deduction control unit 2, a deduction unit 3, a process flow block knowledge base unit 4, a knowledge base unit for judging process flow 5, and a result output unit 6.

The production process information 1 is information for showing a production process procedure in a production line for a plurality of items with its varying quantity which has a plurality of production steps, which comprises a combination of a small step name and a big step name to which a small step name belongs.

The deduction control unit 2 inputs the production process information 1, delivering the production process information 1 to a first deduction unit A 104 of the deduction unit 3, controlling the judgement on a production process procedure of the first deduction unit A 104 and a second deduction unit B 105 of the deduction unit 3, and delivering a result of judgement obtained by the deduction unit 3 to the result output unit 6.

The deduction unit 3 comprises the first deduction unit A 104 and the second deduction unit B 105.

The first deduction unit A 104 of the deduction unit 3 inputs the production process information 1 delivered from the deduction control unit 2, referring to the process flow block knowledge base unit 4, dividing a production process procedure into big step blocks, and delivering information as to the production process procedure with the divided blocks to the second deduction unit B 105 of the deduction unit 3.

The second deduction unit B 105 of the deduction unit 3 inputs the information delivered from the first deduction unit A 104 of the deduction unit 3, referring to the knowledge base unit 5 for judging process flow, judging whether or not the lineup order of the names of big step blocks and the lineup order of the names of small steps in each of the blocks are normal, and delivering a result of the judgement to the deduction control unit 2.

The process flow block knowledge base unit 4 comprises a block knowledge unit 101 with combination of big step name and small step name, where a big step name and a small step name which belongs to a big step are stored as knowledge. Besides, referring to information as to big step names and small step names stores in the block knowledge unit 101, a big step or a small step to which a nonstandard name is assigned can be extracted.

The knowledge base unit 5 for judging process flow comprises a knowledge unit 102 for judging before and after blocks which stores a knowledge for judging a relationship with the before and after blocks which are divided as big steps, and a knowledge unit 103 for judging internal block which stores a knowledge for judging the lineup order of small step names in each block.

The result output unit 6 outputs a result of judgement delivered from the deduction control unit 2 in a predetermined form.

Figure 3:
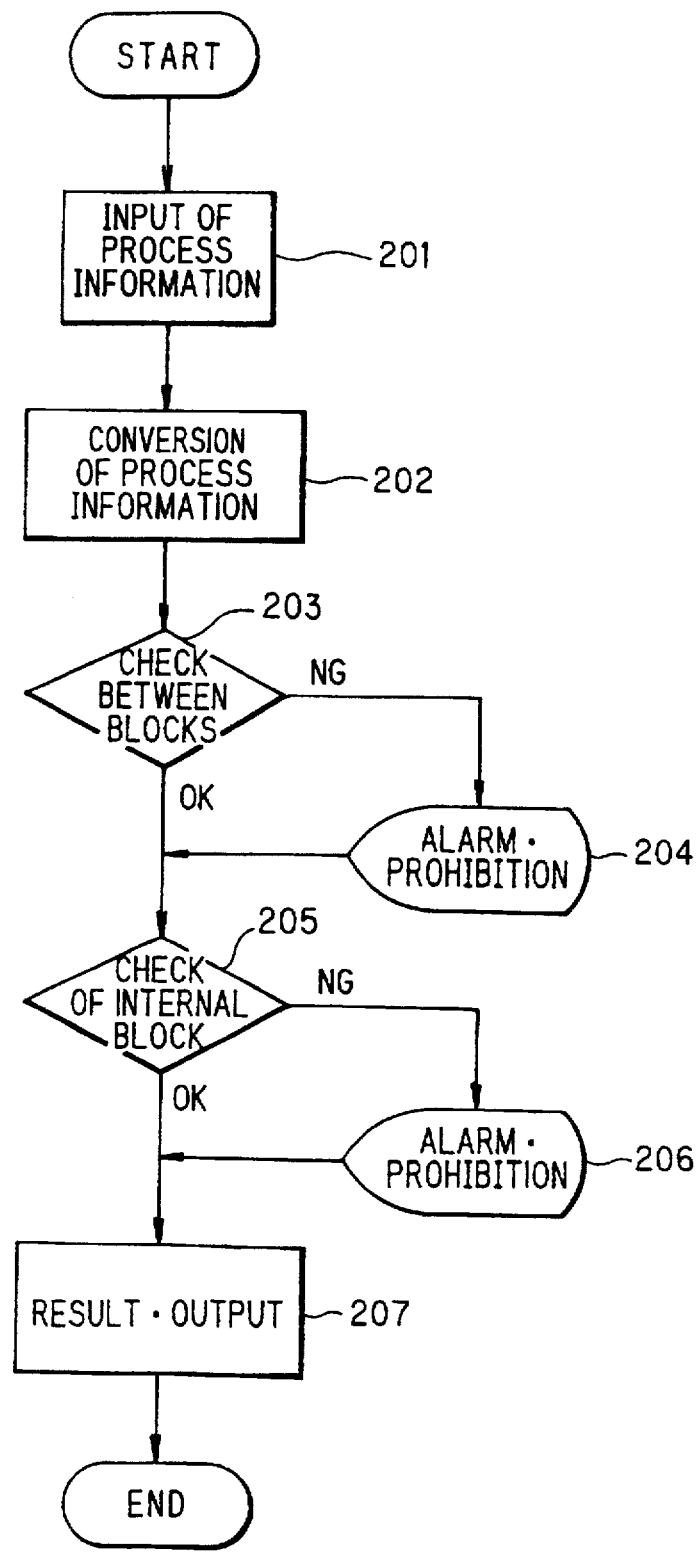
FIG. 3 is a flow chart for explaining an operation in the first embodiment.

With reference to FIGS. 2 and 3, an operation of the check system in the first embodiment according to the invention will be explained. FIG. 3 is a flow chart for explaining the operation of the check system in the first embodiment.

First, the production process information 1 which is prepared by hand is input to the deduction control unit 2, and then the production process information 1 is delivered to the first deduction unit A 104 by the deduction control unit 2(Step 201).

The first deduction unit A 104 of the deduction unit 3 refers to the block knowledge unit 101 with combination of big step name and small step name of the process flow block knowledge base unit 4, converting the delivered production process information 1 into a predetermined form, thereafter delivering the converted information to the second deduction unit B 105(Step 202).

Figure 4:
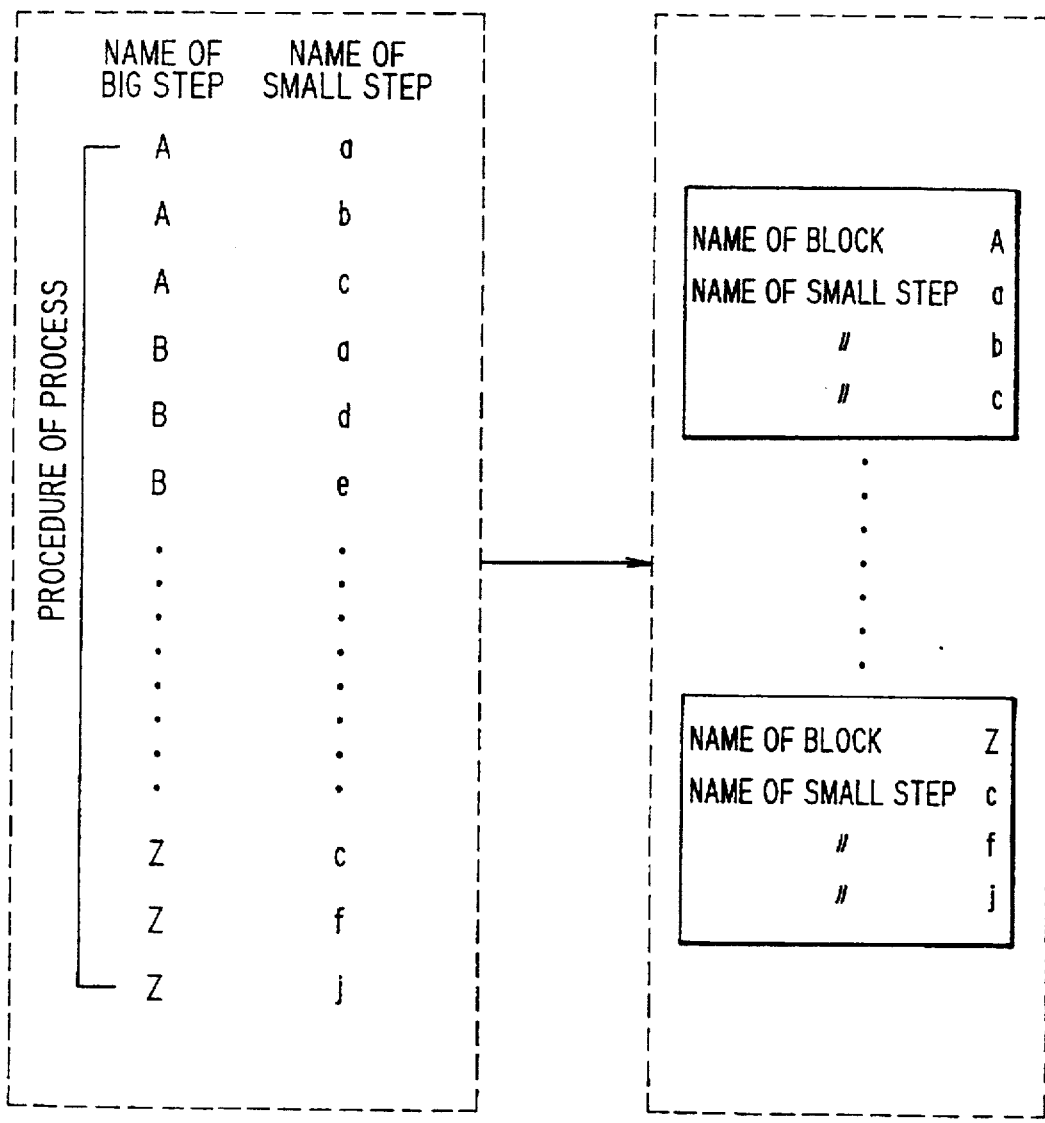
FIG. 4 is an illustration of data in a production process procedure used in the first embodiment.

FIG. 4 is an illustration of data in a production process procedure used in the first embodiment. As shown in FIG. 4, the production process information 1 which is input to the deduction control unit 2 takes the form of a production process procedure 4-1, then being converted a production process procedure 4-2 which includes divided big step blocks (hereinafter also referred to as 'block knowledge') by the first deduction unit A 104.

Thereafter, the second deduction unit B 105, to which the block knowledge 4-2 is delivered from the first deduction unit A 104 of the deduction unit 3, refers to the knowledge unit 102 for judging before and after blocks of the knowledge base unit 5 for judging process flow, thereby checking the lineup order of the respective block names of the block knowledge 4-2(Step 203). Namely, it judges whether one block name following another block name is of an allowable step, whether it is of a step allowed within a predetermined condition, or whether it is of a prohibited step.

FIG. 5A shows a content of the knowledge unit 102 for judging before and after blocks in FIG. 2.

As shown in FIG. 5A, the knowledge unit 102 for judging before and after blocks stores a knowledge for judgement as to relationships with before and after block names on crossing points, where block names(big step names) lie on the lateral axis and block names(big step names) following the previous block names lie on the longitudinal axis. For example, when a block name 'B' exists after a block name 'A', a judgement('Δ') that it is allowed within a predetermined condition will be made. Besides, in FIG. 5A, 'O' means that a block name in the longitudinal axis following another block name in the lateral axis is of an allowable step, and 'X' means that it is of a prohibited step.

From the result of Step 203 where the before and after block names are checked, if the lineup order of block names is judged as allowable(in case of 'OK' in Step 203), then being advanced to the next, Step 205, and, if the lineup order of block names is judged as prohibited or allowable within a predetermined condition(in case of 'NG' in Step 203), then notifying a prohibition or an alarm (Step 204).

When Step 203 is 'OK', or, after the process of Step 204 is completed, the second deduction unit B 105 of the deduction unit 3 further refers to the knowledge unit 103 for judging internal block of the knowledge base unit 5 for judging process flow, comparing the lineup order of small step names in each block of the block knowledge 4-2 in FIG. 4 with a standard pattern(model pattern) as to the lineup order of small step names which is stored in the knowledge base unit 103 for judging internal block, thereby judging whether or not the lineup order of small step names is allowed(Step 205).

FIG. 5B show a content of the knowledge base unit 103 for judging internal block in FIG.2.

As shown in FIG. 5B, the knowledge base unit 103 for judging internal block stores some model patterns as to the lineup order of small step names in each block name(big step name). For example, the model patterns as to the lineup order of small step names in a block A are 'a-b-c-d . . . . . .' and 'a-b-e-f . . . . . .'.

From the result of Step 205 where the internal block is checked, if the lineup order of small step names is different from the model pattern stored in the knowledge base unit 103 for judging internal block(in case of 'NG' in Step 205), then notifying the deduction control unit 2 of a prohibition or an alarm depending on the kind of difference(Step 206), and, if the lineup order of small step names in the block corresponds to the model pattern(in case of 'OK' in Step 205), then being advanced to the next, Step 207.

When Step 205 is 'OK', or, after the process of Step 206 is completed, both the results of judgement in Step 203 and Step 205 are delivered to the deduction control unit 2, and a final result of judgement is then output through the result output unit 6(Step 207).

A check system for a production process procedure in the second preferred embodiment will be explained in FIG. 6.

Figure 6:
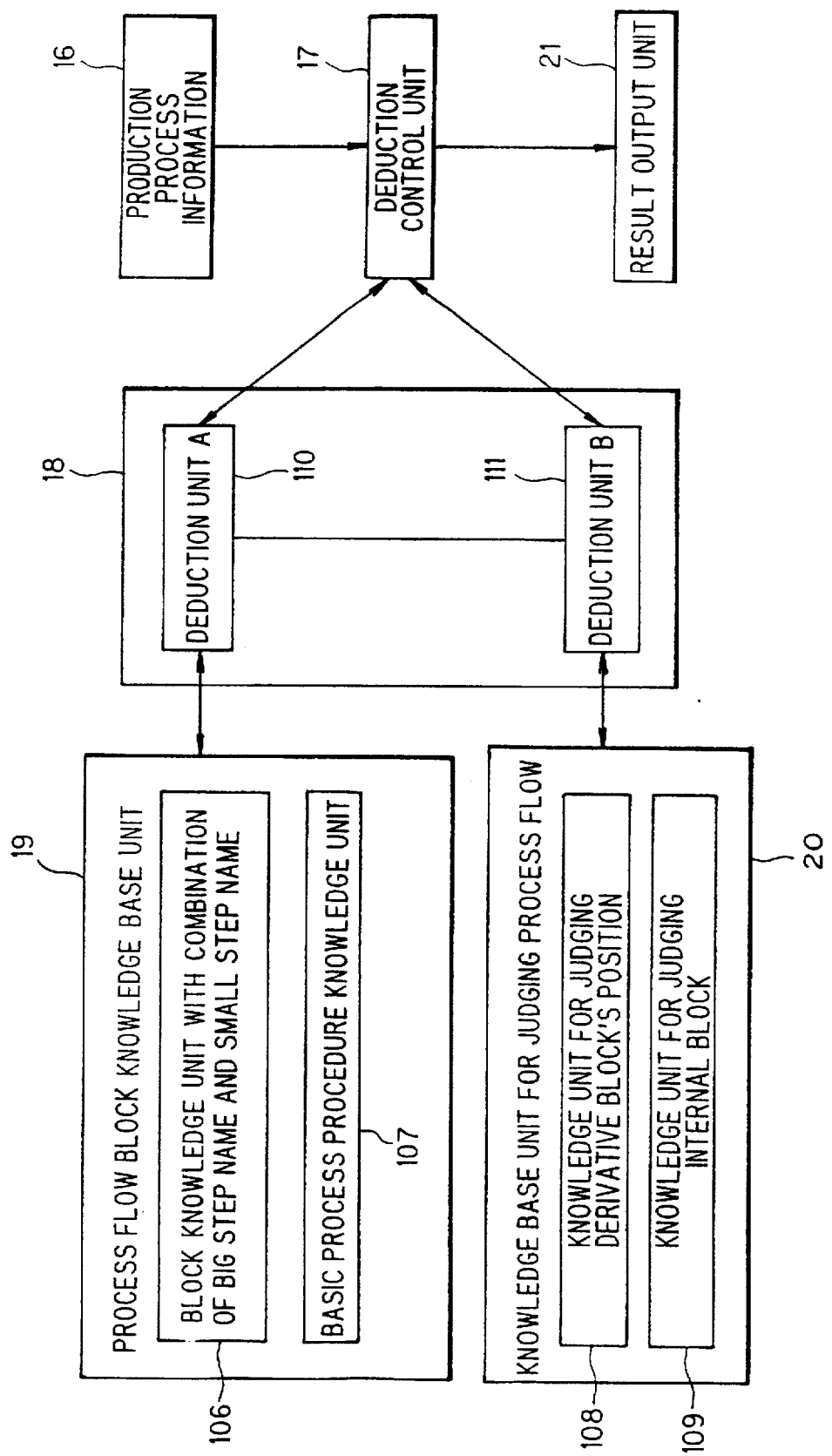
FIG. 6 is a block diagram showing a check system for a production process procedure in a second preferred embodiment according to the invention.

As shown in FIG. 6, the check system in the second embodiment comprises production process information 16, a deduction control unit 17, a deduction unit 18, a process flow block knowledge base unit 19, a knowledge base unit for judging process flow 20, and a result output unit 21.

The production process information 16 is information for showing a production process procedure in a production line for a plurality of items with its varying quantity which has a plurality of production steps, which comprises a combination of a small step name and a big step name to which a small step name belongs.

The deduction control unit 17 inputs the production process information 16, delivering the production process information 1 to a first deduction unit A 110 of the deduction unit 18, controlling the judgement on a production process procedure of the first deduction unit A 110 and a second deduction unit B 111 of the deduction unit 3, and delivering a result of judgement obtained by the deduction unit 18 to the result output unit 21.

The deduction unit 18 comprises the first deduction unit A 110 and the second deduction unit B 111.

The first deduction unit A 110 of the deduction unit 18 inputs the production process information 16 delivered from the deduction control unit 17, referring to the process flow block knowledge base unit 19, dividing a production process procedure into big step blocks, further dividing the divided big step blocks into a basic process procedure block and a derivative block, and delivering information as to the divided basic process procedure block and derivative block to the second deduction unit B 111 of the deduction unit 18.

The second deduction unit B 111 of the deduction unit 18 inputs the information delivered from the first deduction unit A 110 of the deduction unit 18, referring to the knowledge base unit 20 for judging process flow, judging whether or not a position of a derivative inserted between basic process procedure blocks and the lineup order of the names of small steps in each of blocks including the derivative block are normal, and delivering a result of the judgement to the deduction control unit 17.

The process flow block knowledge base unit 19 comprises a block knowledge unit 106 with combination of big step name and small step name, and a basic process procedure knowledge unit 107 which stores a knowledge as to a basic process procedure of a production process procedure.

The knowledge base unit 20 for judging process flow comprises a knowledge unit 108 for judging derivative block's position which stores a knowledge for judging the position of a derivative block inserted between basic process procedure blocks, and a knowledge unit 109 for judging internal block which stores a knowledge for judging the lineup order of small names in each block.

The result output unit 21 outputs a result of judgement delivered from the deduction control unit 17 in a predetermined form.

With reference to FIG. 6 and FIG. 3 which is used in the explanation for the operation of the check system in the first embodiment, an operation of the check system in the second embodiment according to the invention will be explained.

First, the production process information 16 which is prepared by hand is input to the deduction control unit 17, and then the production process information 16 is delivered to the first deduction unit A 110 by the deduction control unit 17(Step 201).

The first deduction unit A 110 of the deduction unit 18 refers to the block knowledge unit 106 with combination of big step name and small step name of the process flow block knowledge base unit 19, converting the delivered production process information 16 into a predetermined form, thereafter delivering the converted information to the second deduction unit B 111(Step 202).

Figure 7:
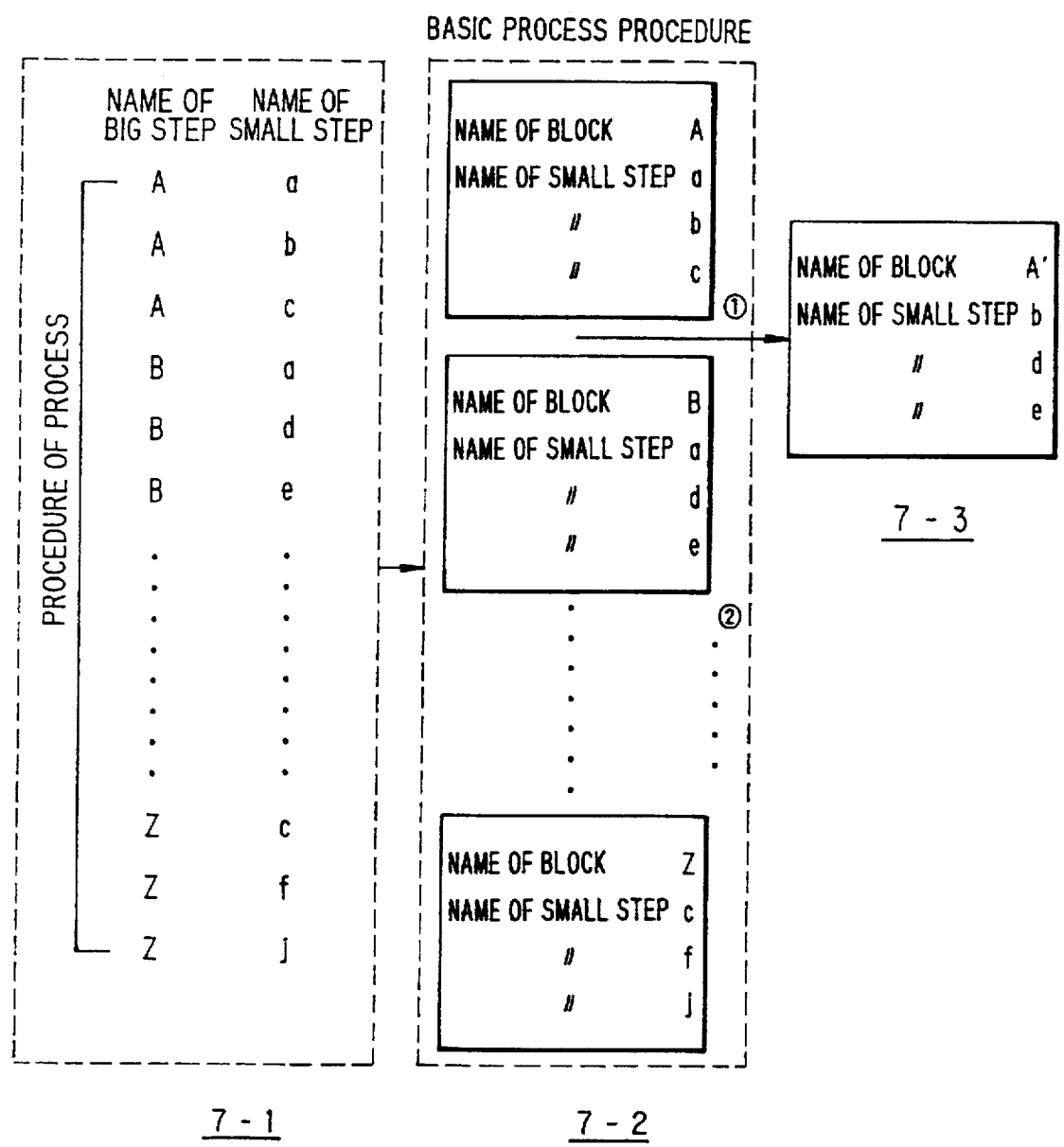
FIG. 7 is an illustration of data in a production process procedure used in the second embodiment.

FIG. 7 is an illustration of data in a production process procedure used in the second embodiment. As shown in FIG. 7, the production process information 16 which is input to the deduction control unit 17 takes the form of a production process procedure 7-1, then being divided into big step blocks and further divided into the basic process procedure blocks 7-2 and the derivative block 7-3 by the first deduction unit A 110.

Thereafter, the second deduction unit B 111, to which the basic process procedure block 7-2 and the derivative block 7-3 are delivered from the first deduction unit A 110 of the deduction unit 18, refers to the knowledge unit 108 for judging derivative block's position of the knowledge base unit 20 for judging process flow, thereby checking whether or not the position of the derivative block 7-3 inserted between the basic process procedure blocks 7-2 is normal, if necessary, notifying a prohibition or an alarm(Step 203, 204).

FIG. 8 shows a content of the knowledge unit 108 for judging derivative block's position in FIG. 6.

As shown in FIG. 8, the knowledge unit 108 for judging derivative block's position stores a knowledge for judgement as to whether or not the position of a derivative block inserted between basic process procedure blocks is normal on crossing points, where derivative block names(big step names) lie on the lateral axis and positions of derivative blocks inserted basic process procedure blocks lie on the longitudinal axis. For example, when a derivative block name 'A' ' is inserted at a position (1) of the basic process procedure, it is judges as normal('O'), and, when it is inserted at a position(2), it is judged as not normal('X').

After the position of the inserted derivative block is checked in Step 203 and Step 204, the second deduction unit B 111 of the deduction unit 18 further refers to the knowledge unit 109 for judging internal block of the knowledge unit 20 for judging process flow, then comparing the lineup order of small step names in the basic process procedure block 7-2 and the derivative block 7-3 with a model pattern as to the lineup order of small step names stored in the knowledge unit 109 for judging internal block, thereby judging whether or not the lineup order of small step names is allowed, if necessary, notifying a prohibition or an alarm (Step 205, 206).

Then, both the results of judgement in Step 203 and Step 205 are delivered to the deduction control unit 17, and a final result of judgement is output through the result output unit 21(Step 207).

In the second embodiment, since the judgement as to a production process procedure is conducted after it is divided into basic process procedure blocks and derivative blocks, the size of a knowledge base can be smaller than that in the first embodiment.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A check system for a production process procedure in a production line for a plurality of items of varying quantity, which production process has a plurality of production steps, the check system comprising the steps of:

supplying information of said production process procedure with a combination of a big step name and a small step name which have a hierarchical relation with each other to a first deduction means;

dividing said production process procedure into one or more big step blocks on a process flow block knowledge base referred to by said first deduction means, wherein said process flow block knowledge base includes a knowledge unit for storing a knowledge as to a combination of a big step name and a small step name;

supplying information as to said divided blocks to a second deduction means; and judging whether or not a lineup order of said one or more big step blocks and a lineup order of a small step name in each of said blocks are normal on a knowledge base for judging process flow referred to by said second deduction means, wherein said knowledge base for judging process flow includes a before and after block knowledge unit for storing a knowledge for judging a relationship with before and after block names and an internal block knowledge unit for storing a knowledge for judging the lineup order of a small step name in each of said block.

2. A check system for a production process procedure, according to claim 1, wherein:

said internal block knowledge unit stores a knowledge as to one or more model patterns in which one or more small step names corresponding to each block name are lined up in a predetermined order; and said second deduction means judges whether or not a lineup order of small step names in each of said blocks is normal by comparing the lineup order of small step names in each of said blocks with said one or more model patterns.

3. A check system for a production process procedure in a production line for a plurality of items with its varying quantity which has a plurality of production steps, comprising the steps of:

supplying information of said production process procedure with a combination of a big step name and a small step name which a hierarchical relation with each other to a first deduction means;

dividing said production process procedure into one or more basic process procedure blocks and derivative blocks on a process flow block knowledge base referred to by said first deduction means, wherein said process flow block knowledge base includes a knowledge unit for storing a knowledge as to a combination of a big step name and a small step name and a knowledge unit for storing a knowledge as to said basic process procedure blocks;

supplying information as to said divided blocks to a second deduction means; and judging whether or not a position of a derivative block inserted between said basic process procedure blocks and a lineup order of a small step name in each of said blocks are normal on a knowledge base for judging process flow referred to by said second deduction means, wherein said knowledge base for judging process flow includes a derivative block position knowledge unit for storing a knowledge for judging said position of said derivative block inserted between said basic process procedure blocks and an internal block knowledge unit for storing a knowledge for judging the lineup order of a small step name in each of said blocks.

4. A check system for a production process procedure, according to claim 3, wherein:

said internal block knowledge unit stores a knowledge as to one or more model patterns in which one or more small step names corresponding to each block name are lined up in a predetermined order; and said second deduction means judges whether or not a lineup order of small step names in each of said blocks is normal by comparing the lineup order of small step names in each of said blocks with said one or more model patterns.

* * * * *